United States Patent Office 2,699,753
Patented Jan. 18, 1955

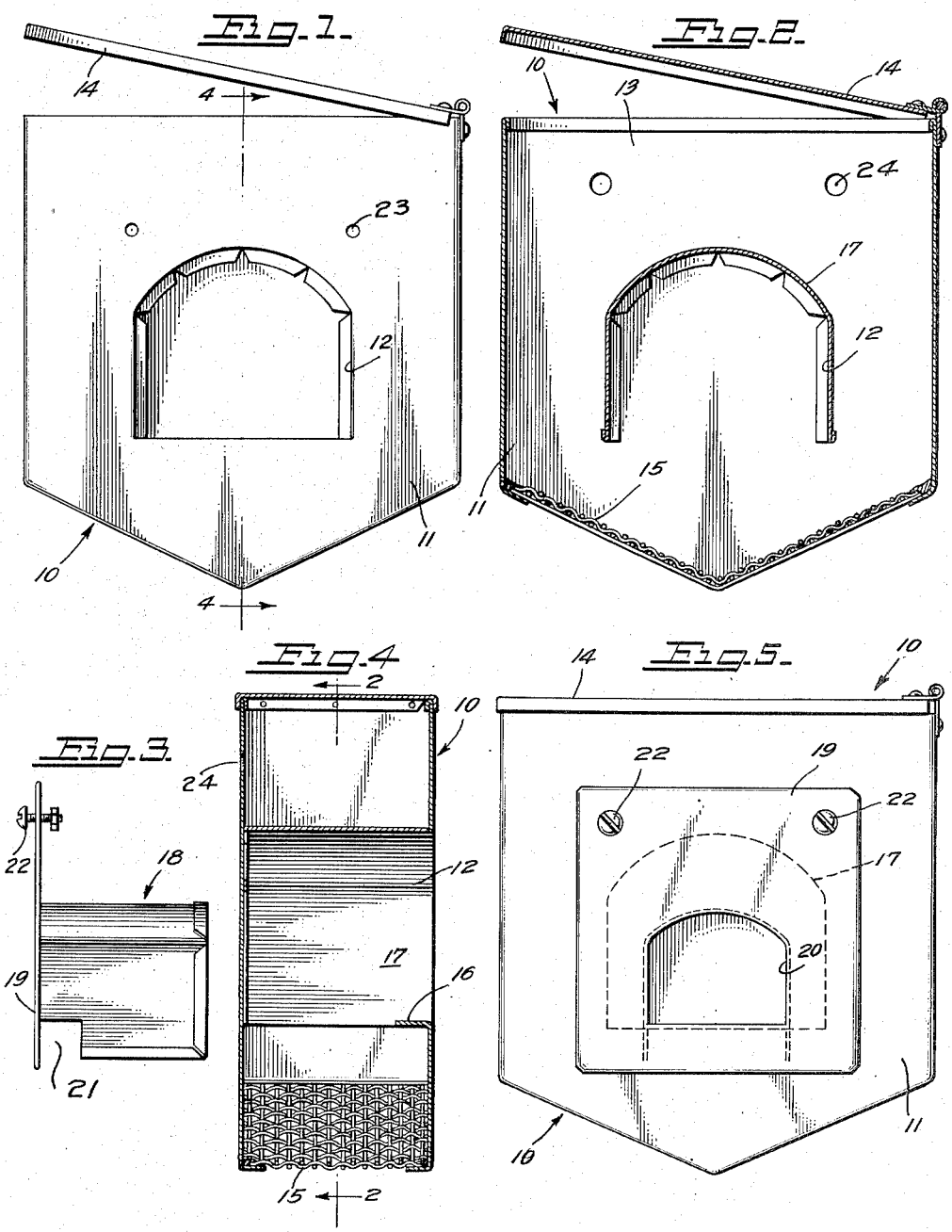

2,699,753
FOOD DISPENSER FOR RABBITS AND OTHER ANIMALS

Samuel M. Poiley, Baltimore, Md.

Application December 17, 1951, Serial No. 262,144

3 Claims. (Cl. 119—52)

(Granted under Title 35, U. S. Code (1952), sec. 266)

The invention described herein may be manufactured and used by or for the Government of the United States for governmental purposes without the payment to me of any royalty thereon in accordance with the provisions of the act of April 30, 1928 (ch. 460, 45 Stat. L. 467).

My invention relates to food dispensers for feeding caged rabbits, guinea pigs and similar animals.

It provides a device which prevents the contamination of the food supply by the animals' bodily excretions, as well as the wasting of food by the animals, which during feeding scratch food from a dispenser, to become contaminated on a cage floor by bodily excretions of the animals.

My invention also provides an adapter for use with a dispenser whereby a single dispenser may be converted for the feeding of animals smaller than the standard size of dispenser, thereby reducing the expense of providing a supply of dispensers for use with every possible size of animal which may be used for experiments in a scientific laboratory.

In the accompanying drawings, which illustrate a preferred embodiment of my invention:

Figure 1 is a front elevation of my dispenser with a hinged closure in partly open position.

Figure 2 is a vertical section on the line 2—2 of Figure 4.

Figure 3 is a side elevation of a detachable adapter.

Figure 4 is a section on the line 4—4 of Figure 1 with closure in closed position.

Figure 5 is a front elevation of the dispenser with the adapter mounted for use therein.

In these drawings:

My feed dispenser 10 comprises a shell 11, preferably made of non-rusting sheet metal, or other suitable material, which can be washed or sterilized with steam and stand hard usage, is provided with a lateral feeding opening 12, a charge admitting opening 13, a hinged closure 14 for the opening 13 and a screening bottom 15, and an inwardly extending ledge 16. The dispenser is provided with a central bottomless transverse shell 17 framing said feeding opening 12.

A detachable adapter 18 comprises a face plate 19 having an opening 20 which will admit only the head of an animal to be fed and an inwardly extending rigidly attached bottomless cylindrical shield which frames the opening 20 and is notched at 21 to permit the shield 20 to be passed over the ledge 16. Threaded bolts 22 are threaded through holes 23 in the shell 11 and provide a means for detachably mounting the adapter 18 in the feed dispenser 10. The feed dispenser may be detachably mounted on the inside of a cage by hooks which pass through holes 24 in the shell 11 and may be readily detached for cleaning.

In operation, a charge of food pellets is poured through the charge admitting opening 13 and is deflected by the transverse partition 17 through lateral passages which terminate in a bottom fed holding space. The screening bottom 15 is preferably V-shaped in cross section to direct the food by gravity toward the center and under the opening 12, so that older charges of food will be entirely consumed before new charges reach the eating position. The maximum level at which the food is available to the animal is controlled by a downward extension of the sides of the shell 17. Dirt and undesirable powdered food escape through the screening bottom 15.

The feeding opening 12 is designed to admit the head of a large rabbit, but is too small in circumference and particularly in depth to admit its feet while the animal's neck is in the opening. This is to discourage the scratching out of food by animals such as rabbits and guinea pigs, which do not ordinarily scratch unless they can see what they are scratching. The ledge 16 also helps to prevent the animal from scratching food out through the opening 12 to be contaminated and wasted.

For use with smaller rabbits or guinea pigs, the adapter 18 is attached by means of the bolts 22. Several sizes of adapters may be used to accommodate all sizes of animals to be experimented with.

Various modifications of my device may be made within the scope of my claims to my dispenser and to my adapter.

What I claim is:

1. A feed dispenser comprising, in combination, a receptacle for the feed having a screening bottom, a lateral feeding opening, an internal deflector hood extending about said opening and terminating below the opening in spaced relation to said bottom for permitting food to gravitate to form a feeding level spaced below said opening, and a detachable adapter comprising a face plate having a feeding opening therethrough smaller than the feeding opening of the receptacle and securable thereover, said adapter having a bottomless shield extending inwardly about the top and sides of its feeding opening and notched to fit over the lower edge of the feeding opening of the receptacle to extend therebelow when said adapter is secured to said receptacle.

2. A feed dispenser comprising, in combination, a receptacle for the feed having a screening bottom, a lateral feeding opening, an internal deflector hood extending about said opening and terminating below the opening in spaced relation to said bottom for permitting food to gravitate to form a feeding level spaced below said opening, and said receptacle including means for preventing an animal from pawing feed through said opening comprising a lip at the bottom of said opening and projecting inwardly therefrom at a level above the level of the bottom edges of said hood and thus defining a space thereunder above the feeding level established by the hood to receive feed pawed toward the opening by an animal, and a detachable adapter comprising a face plate having a feeding opening therethrough smaller than the feeding opening of the receptacle and securable thereover, said adapter having a bottomless shield extending inwardly about the top and sides of its feeding opening and notched to fit over said lip and to extend therebelow when said adapter is secured to said receptacle.

3. A feed dispenser comprising, in combination, a receptacle for the feed having a screening bottom, a lateral feeding opening, an internal deflector hood extending about said opening and terminating below the opening in spaced relation to said bottom for permitting food to gravitate to form a feeding level spaced below said opening, and said receptacle including means for preventing an animal from pawing feed through said opening comprising a lip at the bottom of said opening and projecting inwardly therefrom at a level above the level of the bottom edges of said hood and thus defining a space thereunder above the feeding level established by the hood to receive feed pawed toward the opening by an animal, and a detachable adapter comprising a face plate having a feeding opening therethrough smaller than the feeding opening of the receptacle and securable thereover, said adapter having a bottomless shield extending inwardly about the top and sides of its feeding opening and notched to fit over said lip and to extend therebelow when said adapter is secured to said receptacle, said shield, when the adapter is in place, terminating in spaced relation to the bottom of said receptacle at a level lower than that at which said hood terminates.

References Cited in the file of this patent

UNITED STATES PATENTS

| | | |
|---|---|---|
| 610,775 | Thompson, Jr. | Sept. 13, 1898 |
| 1,610,614 | McCollough | Dec. 15, 1926 |
| 1,831,828 | Swendsen | Nov. 17, 1931 |

FOREIGN PATENTS

| | | |
|---|---|---|
| 9,395 | Great Britain | 1904 |
| 15,218 | Denmark | Oct. 30, 1911 |
| 600,652 | Germany | July 27, 1934 |